(12) United States Patent
Chiecchi

(10) Patent No.: US 8,376,793 B2
(45) Date of Patent: Feb. 19, 2013

(54) METHOD FOR CONTROLLING A SURFACE DRIVE FOR A WATERCRAFT IN THE UPPER SPEED RANGE

(75) Inventor: Andrea Chiecchi, Verona (IT)

(73) Assignee: ZF Friedrichshafen AG, Friedrichshafen (DE)

( * ) Notice: Subject to any disclaimer, the term of this patent is extended or adjusted under 35 U.S.C. 154(b) by 283 days.

(21) Appl. No.: 12/678,882

(22) PCT Filed: Dec. 6, 2007
(Under 37 CFR 1.47)

(86) PCT No.: PCT/EP2007/063438
§ 371 (c)(1),
(2), (4) Date: Jul. 26, 2010

(87) PCT Pub. No.: WO2009/046769
PCT Pub. Date: Apr. 16, 2009

(65) Prior Publication Data
US 2011/0151732 A1    Jun. 23, 2011

(30) Foreign Application Priority Data
Oct. 5, 2007 (DE) .......................... 10 2007 048 063

(51) Int. Cl.
*B63H 20/08* (2006.01)
*G05D 3/00* (2006.01)
(52) U.S. Cl. ........................................... 440/53; 701/21
(58) Field of Classification Search ............... 701/21; 440/1, 53, 61 S, 61 T, 61 G, 87
See application file for complete search history.

(56) References Cited

U.S. PATENT DOCUMENTS

| | | | |
|---|---|---|---|
| 3,774,568 A | 11/1973 | Borst et al. | |
| 4,225,148 A | 9/1980 | Andersson | |
| 4,531,427 A | 7/1985 | Nilsson | |
| 4,544,362 A | 10/1985 | Arneson | |
| 4,645,463 A * | 2/1987 | Arneson | 440/57 |
| 4,776,818 A * | 10/1988 | Cahoon et al. | 440/53 |
| 4,931,025 A | 6/1990 | Torigai et al. | |
| 4,939,660 A | 7/1990 | Newman et al. | |
| 5,118,315 A | 6/1992 | Funami et al. | |
| 5,167,546 A | 12/1992 | Whipple | |
| 5,169,348 A | 12/1992 | Ogiwara et al. | |
| 5,203,727 A | 4/1993 | Fukui | |
| 5,263,432 A * | 11/1993 | Davis | 114/286 |

(Continued)

FOREIGN PATENT DOCUMENTS

| CN | 1237524 A | 12/1999 |
|---|---|---|
| DE | 569 396 | 1/1933 |

(Continued)

OTHER PUBLICATIONS

State Intellectual Property Office of the People's Republic of China. Notification of the First Office Action. 6 pages, Apr. 2012.

*Primary Examiner* — Stephen Avila
*Assistant Examiner* — Anthony Wiest
(74) *Attorney, Agent, or Firm* — Davis & Bujold, PLLC

(57) ABSTRACT

A surface drive for a watercraft with at least two drive units that is operated in different speed-dependent driving modes. The trim angles ($\tau\_1, \tau\_2$) of the drive units (140, 140) are adjusted automatically and independently of one another, in order to reach a defined rotational speed ($n\_40$) at which the maximum speed ($v\_40$) is reached, during the driving mode in which the maximum speed of the watercraft is reached.

11 Claims, 6 Drawing Sheets

U.S. PATENT DOCUMENTS

| | | | |
|---|---|---|---|
| 5,326,294 | A | 7/1994 | Schoell |
| 5,385,110 | A | 1/1995 | Bennett et al. |
| 5,549,493 | A | 8/1996 | Bezzi |
| 5,647,780 | A | 7/1997 | Hosoi |
| 5,785,562 | A | 7/1998 | Nestvall |
| 6,431,928 | B1 | 8/2002 | Aarnivuo |
| 6,726,511 | B1 | 4/2004 | Schelman |
| 6,843,195 | B2 | 1/2005 | Watabe et al. |
| 6,899,196 | B2 | 5/2005 | Husain et al. |
| 6,908,350 | B1 | 6/2005 | Roessler et al. |
| 6,997,763 | B2 * | 2/2006 | Kaji ................................ 440/1 |
| 7,137,347 | B2 | 11/2006 | Wong et al. |
| 7,295,905 | B2 | 11/2007 | Yao et al. |
| 7,416,456 | B1 * | 8/2008 | Gonring et al. ................... 440/1 |
| 7,568,549 | B2 | 8/2009 | Wun et al. |
| 2004/0139903 | A1 | 7/2004 | Watabe et al. |
| 2005/0170712 | A1 | 8/2005 | Okuyama |
| 2005/0176312 | A1 * | 8/2005 | Walser et al. ..................... 440/2 |
| 2006/0042532 | A1 | 3/2006 | Wong et al. |
| 2007/0068438 | A1 | 3/2007 | Mizutani |

FOREIGN PATENT DOCUMENTS

| | | |
|---|---|---|
| DE | 31 30 518 A1 | 4/1982 |
| DE | 42 13 561 A1 | 10/1992 |
| DE | 101 58 870 A1 | 5/2003 |
| DE | 10 2004 050 014 A1 | 6/2005 |
| DE | 10 2005 036 686 A1 | 12/2005 |
| DE | 699 22 397 T2 | 12/2005 |
| DE | 11 2004 001 258 T5 | 10/2006 |
| EP | 0 102 579 A2 | 3/1984 |
| EP | 1 770 008 A2 | 4/2007 |
| EP | 1 792 802 A2 | 6/2007 |
| JP | 2-279495 A | 11/1990 |
| WO | 99/22989 A1 | 5/1999 |

* cited by examiner

METHOD FOR CONTROLLING A SURFACE DRIVE FOR A WATERCRAFT IN THE UPPER SPEED RANGE

This application is a National Stage completion of PCT/EP2007/063438 filed Dec. 6, 2007, which claims priority from German patent application serial no. 10 2007 048 063.8 filed Oct. 5, 2007.

FIELD OF THE INVENTION

The invention relates to a method for controlling a surface drive for a watercraft in the upper speed range.

BACKGROUND OF THE INVENTION

In fast engine-driven watercraft equipped with a surface drive, the propeller shaft is pivotable in all directions about an articulation point with a driveshaft coming from the engine or the transmission. The engine and transmission are situated in the hull of the watercraft. When the propeller shaft is pivoted about a vertical plane parallel to the longitudinal axis of the watercraft, the immersion depth of the propeller and thus the conversion of drive energy into thrust is changed, and the position of the longitudinal axis of the hull in the water relative to the horizontal is influenced. This pivoting of the propeller shaft in the vertical plane is referred to as trimming, and the amount of the pivoting as the trim angle. The surface drive reaches its best efficiency at higher speeds and with only a partially immersed propeller. The optimal trim angle is therefore dependent on the speed of the watercraft and is manually set in conventional watercraft, with the corresponding inaccuracy. To an approximation, the speed of the watercraft is proportional to the rotational speed of the propeller shaft or the rotational speed of the drive, which is proportional to the propeller speed. In designs with multiple drive units, each driven by an engine of its own, it is not possible, due to deviations in the engine characteristics and manufacturing tolerances, to set an identical rotational speed for the driving mode in which the watercraft reaches its highest speed. For this reason, an independent change in the immersion depth is necessary to equalize the rotational speed defined for the highest velocity, since that is how the torque of the drive, and thus its rotation speed, is varied. Moreover, the driver is subjected to additional stress from manual trimming, which alongside his other activities also hinders an optimal setting of the trim angle.

In the prior art, an automatic trim control for a surface drive is described, which sets the trim angle automatically depending on the respective driving mode. The driving modes are defined in this case by the position that the watercraft assumes in the water at different speeds.

SUMMARY OF THE INVENTION

It is the purpose of the invention to specify a method for optimized automatic trim angle adjustment of a surface drive for a watercraft for the driving mode in which the watercraft reaches its maximum speed.

A surface drive for watercraft consists of at least two drive units, each containing a propeller shaft with a propeller in a thrust tube. The thrust tube is pivotally mounted at an articulation point at the stern of the watercraft and the propeller shaft is flexibly connected in the articulation point to a drive shaft. The drive shaft is either directly driven by an engine arranged in the interior of a hull of the watercraft, or by the output of a transmission downstream of the engine. Each drive unit is driven by an engine of its own. The pivoting of the thrust tube and thus the propeller shaft in a vertical plane parallel to the longitudinal axis of the watercraft is referred to as trimming, with the trim angle, as a measure of the pivoting, being bounded by an upper and a lower trim limit. The immersion depth of the propeller is adjusted with the trimming movement. The travel direction of the watercraft is controlled by pivoting the thrust tube in the horizontal plane, the measure of this pivoting being the steering angle, which runs between a left and a right maximum steering angle. To perform the pivoting movements in the two planes, the thrust tube is operated by means of a trimming actuation unit and a steering actuation unit, these being in turn controlled by an electronic control unit. The surface drive is operated in at least two different driving modes, the maximum speed of the watercraft being reached in one driving mode. In this driving mode, the trim angles of the drive units are adjusted automatically and independently of one another, so that a defined rotational speed at which the watercraft reaches its maximum speed is set at each drive unit. The automatic variation of the trim angle is referred to below as automatic trimming, and depending on driving mode is referred to as the trimming mode.

The advantage of independent adjustment of the trim angle for several drive units in the driving mode in which the watercraft reaches the highest speeds is the possibility of uniformly adjusting a defined rotational speed for each drive unit as needed to reach the maximum speed. The independent, individual adjustment of the respective trim angle thus compensates for tolerances regarding the propeller dimensions or the performance characteristics of the engines. In addition, the driver is spared the effort of adjusting the trim angle.

In one advantageous configuration of the invention, in the driving mode in which the highest speed of the watercraft is reached, the trim angles of the individual drive units are automatically adjusted in a closed control loop independently of one another in such a manner that the respective defined rotational speed is set at the drive units.

Alternatively, a previously determined trim angle at which the defined rotational speed for the respective drive unit is reached can be set automatically for each drive unit, independently of the other drive units. The previously determined trim angle was determined by experiment, for example.

It is further possible, in a controlled driving mode in which the highest speed is not reached, to derive the trim angle to be set as a function of a rotational speed or watercraft speed from a value table or a characteristic curve stored in the electronic control unit. Intermediate values are interpolated. As an alternative to the value table or characteristic curve, the trim angle can be calculated from a function stored in the electronic control unit.

It is also possible to store trim angles set during operation, as well as trim tab angles if trim tabs are present, in a learning mode and thereby to generate a characteristic curve or value table.

In addition it can be provided according to a refinement of the invention that, in addition to the driving mode in which the watercraft reaches the highest speed, a slow travel mode is set starting from a first rotational speed limit determined by the idle speed of the engine, in which mode the automatic adjustment of the trim angle is passive. This means that the trim angle can be set manually by the driver anywhere inside the trimming range, but the electronic control unit continuously detects the rotational speed and activates the corresponding automatic operating mode for the successive driving mode when the slow travel mode is exceeded.

In this connection, a further configuration provides that the surface drive is operated in four driving modes wherein, as the rotational speed is increased, a second driving mode follows the slow travel mode starting at the second rotational speed limit, a third driving mode starting at the third rotational speed limit, and a fourth driving mode starting at the fourth rotational speed limit. Automatic trimming in the second driving mode and the third driving mode is implemented in the manner of a controller, i.e., an output of adjustment values without feedback. The fourth driving mode is the mode in which the maximum speed of the watercraft is reached.

It can additionally be provided that, in the slow travel mode, the second driving mode and the third driving mode, the trim angles of the individual drive units are synchronously adjusted, i.e., the adjustment is uniform for all drive units by the same angle in the same direction. The mean value of the rotational speeds of the individual drive units serves as a rotational speed signal, based on which the trim angle is determined from a value table or based on a function in the electronic control unit.

In an alternative version, for a watercraft having at least one trim tab on the left and on the right side of the transom, the trim tabs on the left and the right are synchronously adjusted in the automatic operating mode by an identical trim angle in the same direction between an upper and a lower trim tab limit.

In this connection, it is provided in another configuration that, in the driving mode in which the maximum speed of the watercraft is reached, a previously determined trim tab angle at which the resistance to the travel motion of the watercraft hull is preferably lowest is automatically set by the electronic control unit.

In an alternative embodiment, in the driving mode in which the maximum speed of the watercraft is reached, the trim tab angle is automatically adjusted in a closed control loop in such a manner that the speed of the watercraft is maximal.

BRIEF DESCRIPTION OF THE DRAWINGS

An exemplary embodiment of the invention is shown in the drawing and will be described in detail below.

Therein.

DETAILED DESCRIPTION OF THE PREFERRED EMBODIMENTS

Figure 1:
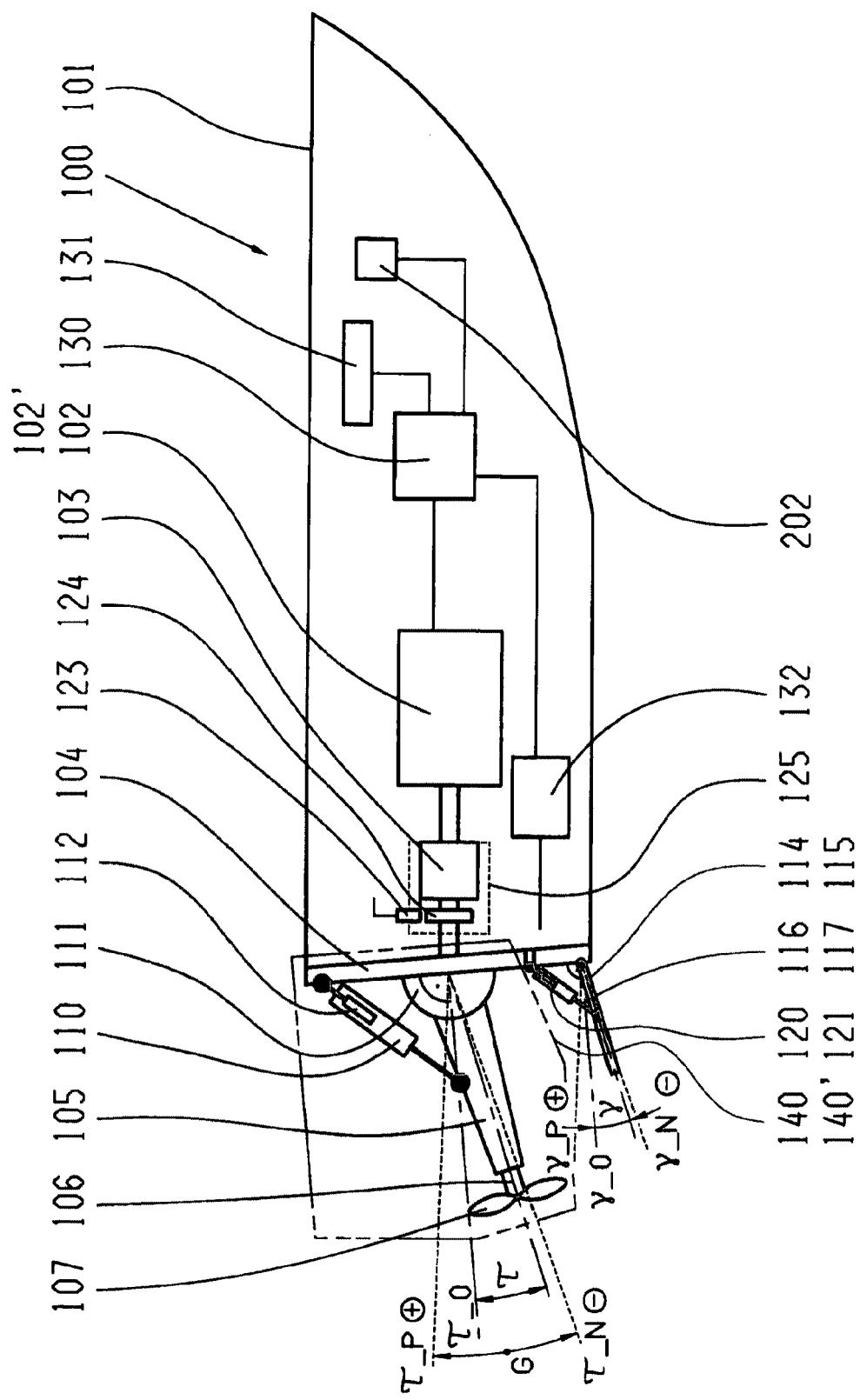
FIG. 1 shows a schematic side view representation of a watercraft with a surface drive.

FIG. 1 shows a schematic side view representation of a watercraft 100 with a surface drive. The drive unit 140 of the surface drive is arranged at the stern on the hull 101 of watercraft 100 and connected to the transom 104. Drive unit 140 consists of thrust tube 105 with propeller shaft 106 and propeller 107, as well as the trim actuation system, which consists of a hydraulic cylinder 110 and a stroke sensor 112. Propeller shaft 106, at the rear end of which propeller 107 is mounted, is rotatably seated in thrust tube 105. In the articulation point 111, thrust tube 105 is pivotally connected to transom 104, and propeller shaft 106 is connected to drive shaft 125, which emerges from a transmission 103 downstream of engine 102. The rotational speed n is measured, for instance, on a slotted disk 124 by a rotational speed sensor 123, whose signal is acquired by electronic control unit 130. The pivoting movement of drive unit 140 in the vertical plane, also referred to as a trim movement, is induced by trim actuation system 110, 112. Trim movement is initiated by electronic control unit 130, which drives the trim actuation system via a central hydraulic unit 132. The measurement for the trim movement of drive unit 140 is the trim angle $\tau$. The trim movement takes place inside a range of angles referred to as the trim range $\tau\_G$, bounded by an upper trim limit $\tau\_P$ and a lower trim limit $\tau\_N$. The neutral trim position $\tau\_0$, defined for example as $\tau\_0 = 0°$, is defined by the line perpendicular to transom 104. In addition, for trimming watercraft 100, two trim tabs 114 and 115, each operated by a trim tab cylinder 116 and 117, are mounted on the right and left respectively, on transom 104. Trim tab cylinders 116 and 117 are likewise controlled by electronic control unit 130 via central hydraulic unit 132. Trim tabs 114 and 115 are set synchronously with one another in the automatic operating mode, so that the trim tab angles on the right and left are always identical and are designated by a common trim tab angle $\gamma$. The movement of trim tabs 114 and 115 is limited by an upper trim tab limit angle $\gamma\_P$ and a lower trim tab limit angle $\gamma\_N$. Between the latter is the neutral position $\gamma\_0$, which is defined by the line perpendicular to transom 104. Trim tab movement is measured with displacement sensors 120 and 121 arranged in trim tab cylinders 116 and 117 respectively, and is acquired in electronic control unit 130, or displayed on control panel 131 like all measured parameters.

Figure 2:
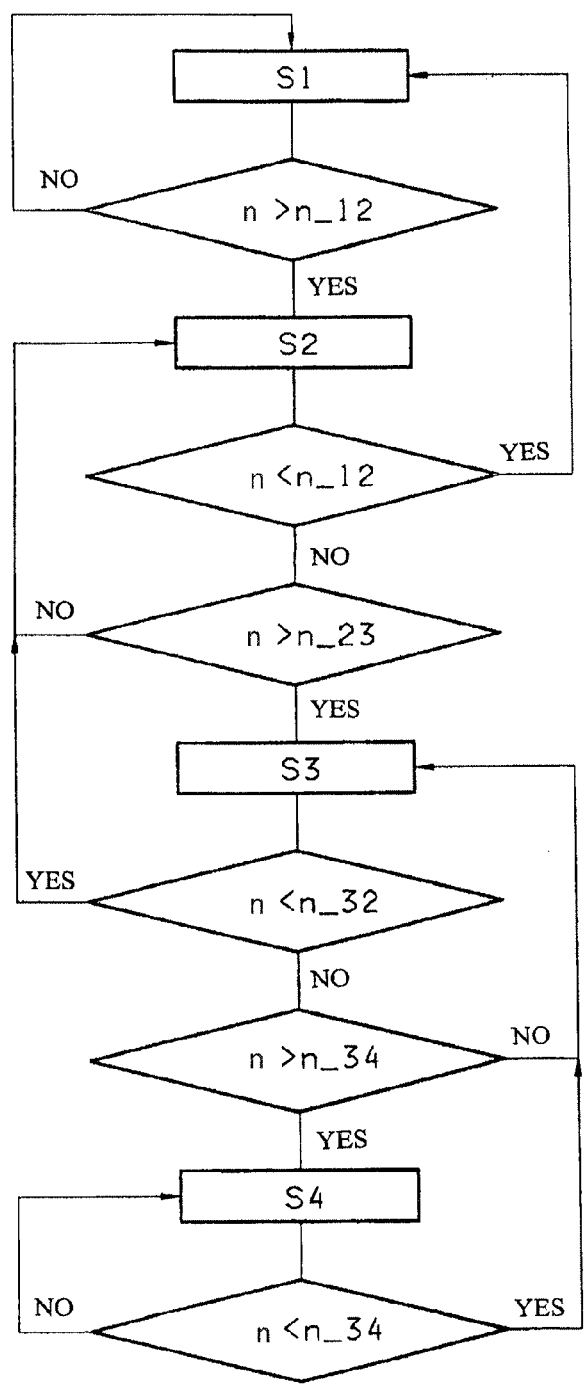
FIG. 2 shows a flowchart for automatic changing of the trim mode.

The automatic changing of the trim mode as a function of the rotational speed n serving as a measure of the watercraft speed, and thus of the driving modes, is shown in FIG. 2 with reference to a flowchart. The rotational speeds of engine 102, driveshaft 125, and propeller shaft 106 are in a proportional relationship to one another due to the fixed gear ratio and the slip-free transfer of transmission 103, so that the rotational speed n is acquired by electronic control unit 130 with allowance for the engine, the transmission, or the propeller shaft as a measuring site. For example, a rotational speed sensor 123 in interaction with a slotted disk 24, or the information from an engine controller is used as the rotational speed measuring device. In the slow travel mode S1, the rotational speed n increases during accelerated travel from the initial rotational speed $n\_11$, which is defined by the idle speed of the engine. In the slow travel mode S1, the watercraft is maneuvered, for example, as is necessary for docking and departure maneuvers. The current rotational speed n is compared in electronic control unit 130 with a rotational speed limit $n\_12$ programmed into electronic control unit 130 from a stored value table 133 or a curve function. If the value of the current rotational speed n is greater than that of rotational speed limit $n\_12$, then the automatic trim control switches to a second driving mode S2, and the trim angle $\tau$ assigned to driving mode S2 in value table 133 is determined. This angle is then transmitted by electronic control unit 130 as an output signal to central hydraulic unit 132, which activates trim actuation system 110, 112, and sets driving unit 140 to the trim angle $\tau$ corresponding to the driving mode. In accelerated travel, the second driving mode S2 is only a temporary driving mode, in which the trimming allows the transition to a third driving mode S3. If the rotational speed in driving mode S2 falls below n_12, the automatic trim control returns to slow travel mode S1. If there is an increase in rotational speed in driving mode S2 and the rotational speed limit n_23 is exceeded, the operating mode for the third driving mode S3 is activated in electronic control unit 130. S3 is the main driving mode of the watercraft with surface drive, whereby here as well the highest efficiency of engine 102 or propeller 104 is achieved, for example. If the rotational speed n is again reduced in driving mode S3, and falls below a rotational speed limit n_32, which is lower than n_23, then the automatic trimming reverts to the mode for driving mode S2. If the rotational speed limit n_34 is exceeded in further acceleration in driving mode S3, then the trim mode for the fourth driving mode S4 is activated in electronic control unit 130. In fourth driving mode S4, engine 102 is under full load and reaches a defined rotational speed n_40 at which the watercraft 100 moves at its highest speed. If the rotational speed n falls back below n_34, the trim angle τ is set to the third driving mode S3. All rotational speed limits can be replaced by watercraft speed limits determined, for example, by experimentation.

Figure 3:
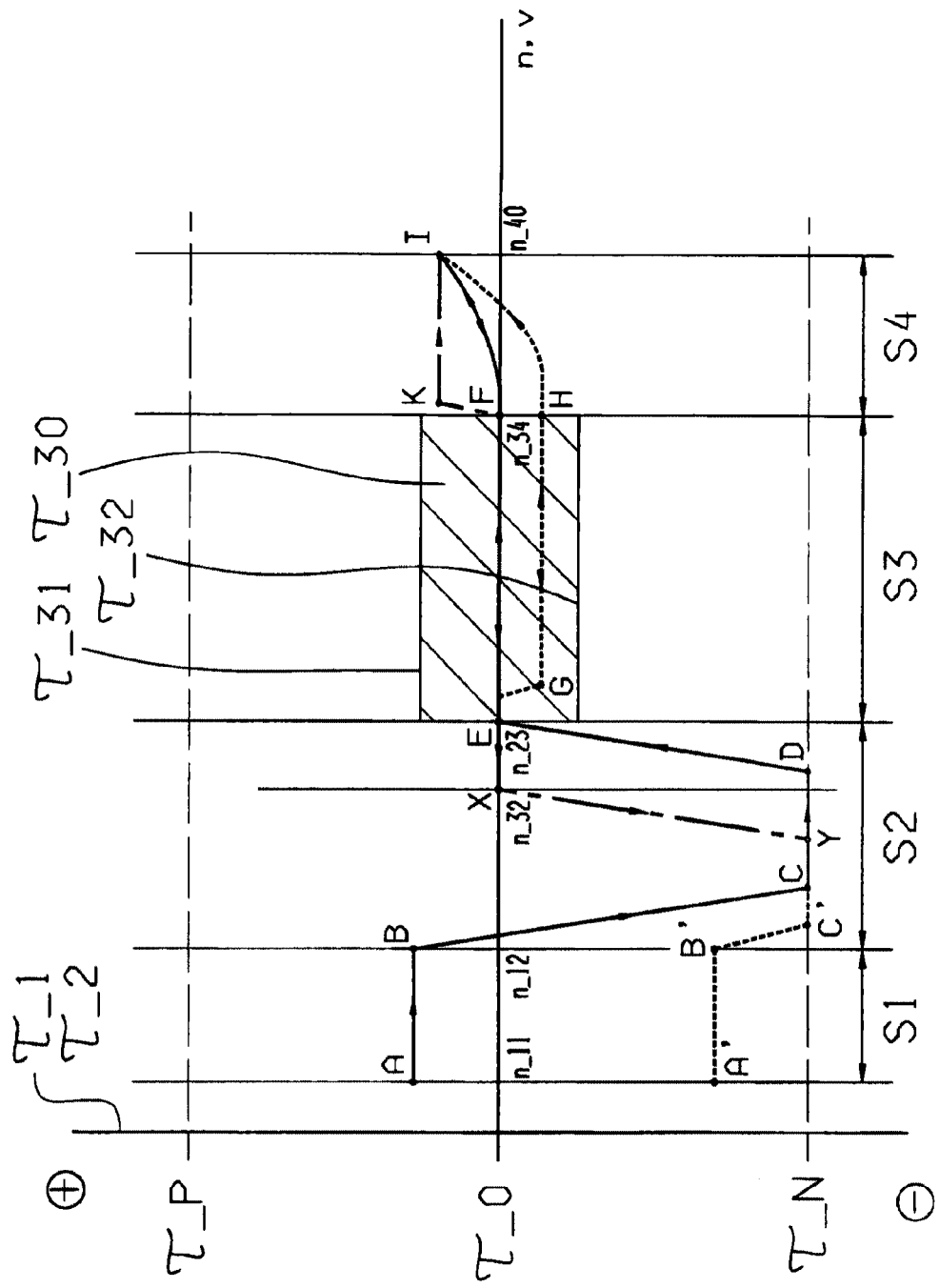
FIG. 3 shows a diagram with the curve of the trim angle versus the rotation speed.

The diagram in FIG. 3 shows for the sake of example a curve of the trim angle τ with respect to the rotational speed n, or with respect to the watercraft speed v, which is proportional to the rotational speed n. In slow travel mode S1, which begins with idle speed n_11, the trim angle τ is freely selectable by the driver between an upper trim limit τ_P and a lower trim limit τ_N, as the alternative trim angles in point A or point A' indicates. Automatic trimming is passive in this driving mode, i.e., the trim angle τ is not automatically controlled or regulated, which is not synonymous with a manual operating mode, however, since electronic control unit 130 detects the rotational speed n or the speed v in the background and, when the rotational speed limit n_12 that delimits the slow travel mode S1 at the top is exceeded, activates the automatic controlled adjustment of the trim angle τ for the second driving mode S2, by acquiring the measured rotational speed n in electronic control unit 130 and then determining the associated trim angle τ from a stored value table 133. In the second driving mode S2, which serves only as a transition area between the slow travel mode S1 and the third driving mode S3, and ends in the cruising phase described by the third driving mode S3, a displacement of the trim angle τ toward the lower trim limit τ_N, which is reached at point C, is necessary for raising watercraft 100 on the stern side. In an additional variant, in this phase trim tabs 114, 115 of driving unit 140 can support drive unit 140 in the raising the watercraft at the stern. Because of the limited dynamics, the displacement cannot be all at once, but can be done only with a time gradient whereby, starting from point B, the trim angle τ falls at a finite adjustment speed with a maximum gradient to the value of the lower trim limit τ_N. Drive unit 140 remains there during accelerating speed until approach to the third driving mode S3 is calculated in electronic control unit 130, taking the gradient into account. At point D the displacement of the trim angle τ starts in such a manner that, when rotational speed limit n_23 is exceeded, drive unit 140 has reached the center position of the trim angle τ_0, which is defined for example as τ_0=0°. In the third driving mode S3, the trim angle τ can be adapted in a set correction range τ_30 between an upper correction limit τ_31 and a lower correction limit τ_32 for adaptation to the surface conditions (line E-G-H).

When there is a reduction of rotational speed in the third driving mode S3 (line E-X), the automatic operating mode of the second driving mode S2 takes effect starting at the rotational speed n_32, which is smaller than the rotational speed n_23 (line E-X-Y). Continuous switching between operating modes in the transition region is avoided by means of this hysteresis.

If the limit speed n_34 is exceeded in the case of a rotational speed increase in the third driving mode S3, the trim angle τ at first remains at the value last set in the third driving mode S3 (point F or H). With the activation of the operating mode for the fourth driving mode S4, the trim angle τ is then changed in a closed control loop in such a manner that a defined rotational speed n_40 or maximum speed v_40 is reached (point I). In an arrangement of two drive units 140, 140', for example, each driven by its own engine 102, 102', in the driving mode in which the highest speed of the watercraft is reached, the trim angles τ_1, τ_2 of the two drive units 140, 140' are adjusted independently of one another in order to reach a defined maximal rotational speed n_40, wherein the rotational speeds of the individual drive units 140, 140' are regulated in such a manner that they must lie within a narrow tolerance range of, for example, 10 rpm. Alternatively to the regulation of the defined rotational speed n_40, control of the two drive units 140, 140' if possible. For this purpose, the trim angle τ_40, τ_40' for each drive unit 140, 140' must be known in advance by which the respective drive unit 140, 140' in connection with the engine 102, 102 reaches the defined rotational speed n_40. This angle is determined in experiments, for example, and then programmed into electronic control unit 130. If the rotational speed exceeds the rotational speed limit n_34, electronic control unit 130 outputs the values of the trim angles τ_40, τ_40' to central hydraulic unit 132 and from there on to the respective trim actuator system 110, 110'. Immediately at the transition from the third driving mode S3 to the fourth driving mode S4, the trim angle τ_40, τ_40' at point K, by which the defined rotational speed n_40 necessary for reaching the maximum speed v_40 is automatically and independently adjusted on each drive unit 140, 140', is set on the respective drive unit 140, 140'.

Figure 4:
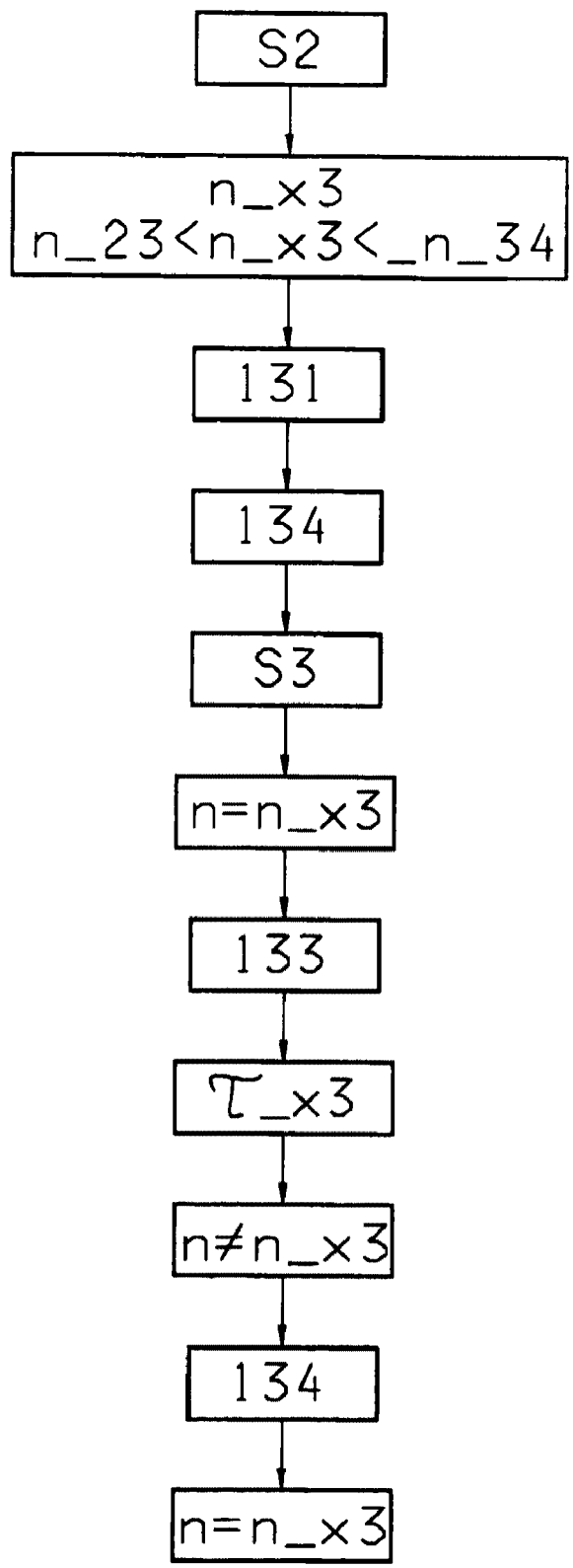
FIG. 4 shows a flowchart for controlling the trim angle in a driving mode in which the maximum speed of the watercraft is not reached.

Using the example of the third driving mode S3, the flowchart in FIG. 4 shows the control of rotational speed for a driving mode in which the maximum speed of the watercraft is not reached. Starting from a lower rotational speed in the lower second driving mode S2, any desired rotational speed n__x3 lying between the rotational speed limits n_23 and n_34 in the third driving mode S3 is set at control panel 131. Engine regulator 134 sets the actual rotational speed n that agrees with the desired rotational speed n__x3. In electronic control unit 130, the actual rotational speed is compared with the rotational speed limits n_23 and n_24 that delimit the third driving mode S3. If this condition is satisfied, electronic control unit 130 outputs the associated trim angle τ__x3 from value table 133 to trimming actuation system 110, 112, whereupon the drive units 140 uniformly assume the trim angle τ__x3. Based on the modified immersion depth of propeller 107, the rotational speed n can vary slightly, but this is compensated for by engine regulator 134, and n=n__x3.

Figure 5:
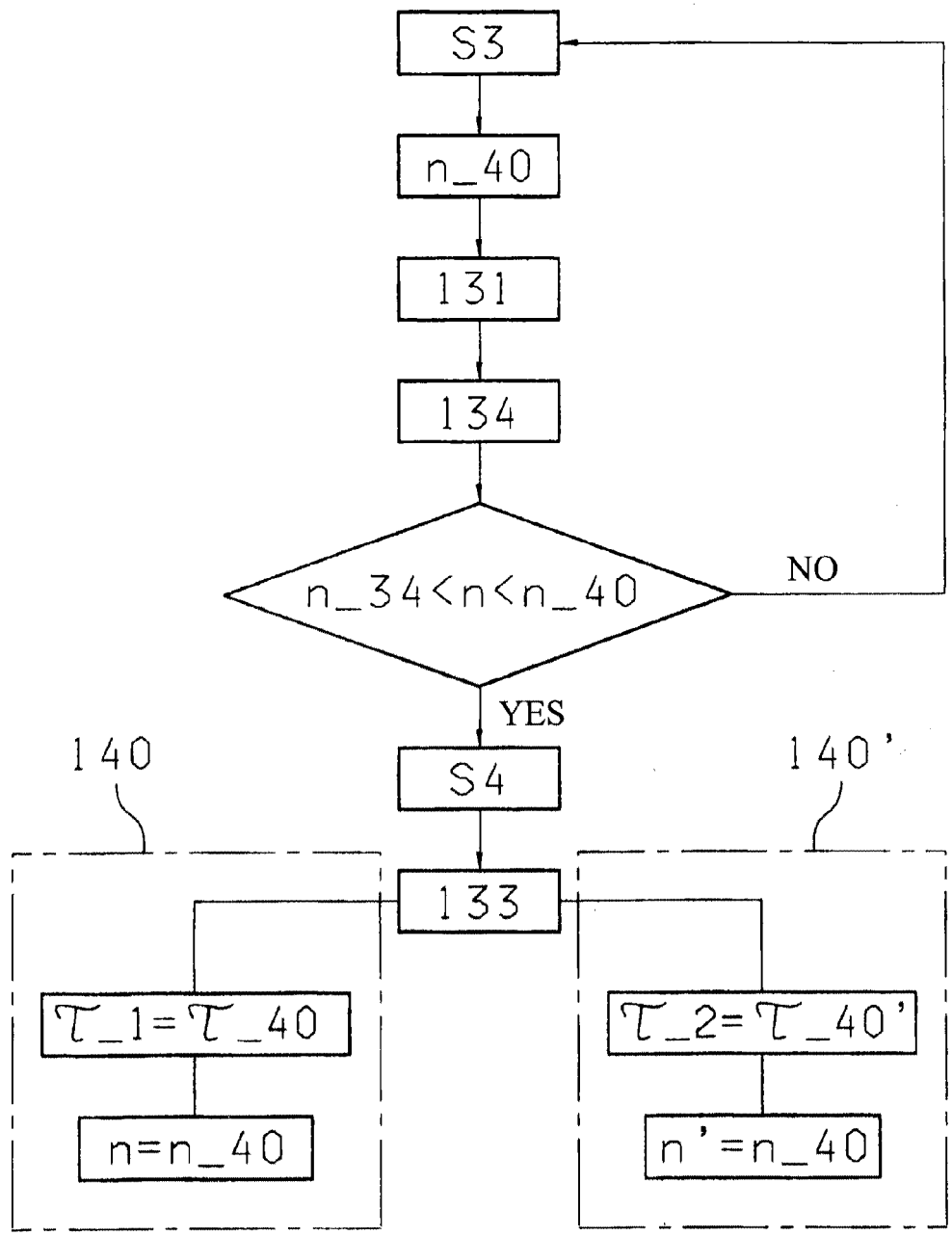
FIG. 5 shows a flowchart for controlling the trim angle in a driving mode in which the maximum speed of the watercraft is reached.

The flowchart in FIG. 5 shows an example for controlling the defined rotational speed n_40 in the driving mode in which the watercraft reaches its maximum speed. Starting from a rotational speed in the third driving mode S3, the desired defined rotational speed n_40 necessary for reaching the maximum speed of the watercraft is input via control panel 131, by means of a selection lever, for example, and transmitted to engine regulator 134, which is a part of electronic control unit 130. In engine regulator 134, the engine parameters are changed in order to reach the defined rotational speed n_40. Since the transition to the driving mode S4, in which the watercraft reaches its maximum speed, is not done with the trim angles setting the defined rotational speed n_40, but rather with the same trim angles τ_1, τ_2 that were set in the third driving mode S3, the actual rotational speeds n, n' of the two drive units 140, 140' are less than the desired defined rotational speed n_40. In electronic control unit 130, the actual rotational speeds n, n' are compared with the rotational speed limit n_34; if they are exceeded, the predetermined trim angles τ_40, τ_40' for the two drive units 140, 140' are output from a value table 133 stored in controller unit 130 to the respective drive unit 140, 140' and set there. In this way the actual rotational speed n, n' becomes equal to the defined rotational speed n_40.

Figure 6:
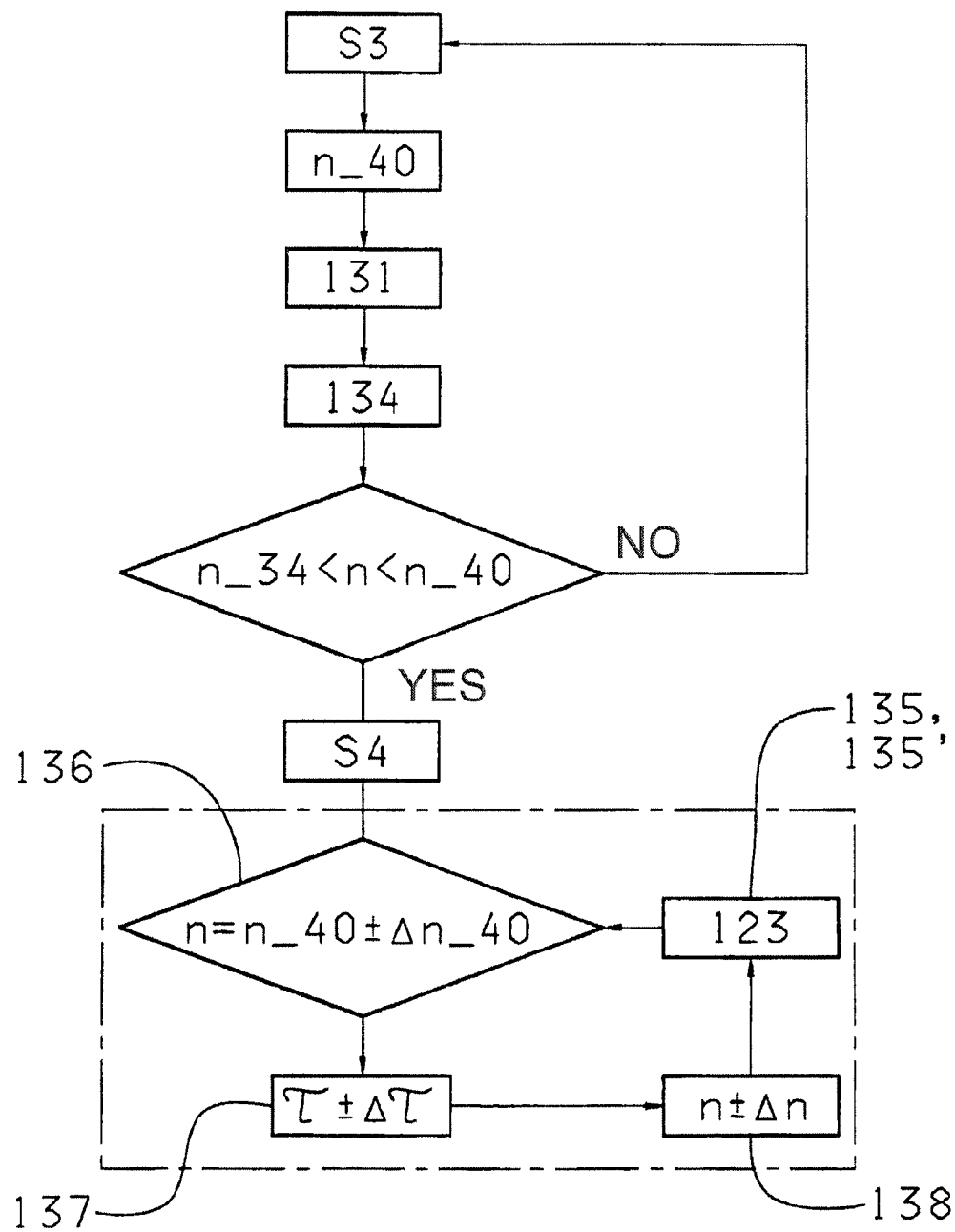
FIG. 6 shows a flowchart for regulating the trim angle in a driving mode in which the maximum speed of the watercraft is reached.

The flowchart in FIG. 6 shows an example for regulating the trim angle τ in the fourth driving mode S4, in which the maximum speed of the watercraft is reached. Starting from a rotational speed in the third driving mode S3, the desired defined rotational speed n_40 required for reaching the maximum speed of the watercraft is input at control panel 131 and transmitted to engine controller 134 in electronic control unit 130. The actual rotational speed n that results is less than the desired rotational speed n_40. In electronic control unit 130, the actual rotational speed n is compared with the rotational speed limit n_34, and if the latter is exceeded, the operating mode for the fourth driving mode S4, i.e., the regulator for the desired rotational speed n_40, is automatically activated. Here the rotational speed n, which represents the control variable, is influenced by varying the trim angle τ, which represents the correcting variable, in a control loop 135, 135' that runs independently for each drive unit 140, 140' until the defined rotational speed n_40, serving as the reference value, is approximated. This rotational speed must be identical in the two drive units 140, 140'. As shown in step 136, the rotational speed n, which is the regulation variable, is compared with the reference value, the defined rotational speed n_40. If the rotational speed n differs from the latter by a control differential Δn_40, then the trim angle τ acting as the correcting variable is varied in step 137 by a trim angle increment Δτ. Thereupon, a new rotational speed n+/−Δn changed by the rotational speed increment Δn takes effect in step 138, and is detected by rotational speed sensor 123 and again compared in electronic control unit 130 with the reference value, the defined rotational speed n_40, in step 136.

REFERENCE NUMERALS

100 Watercraft
101 Hull
102 Drive engine
102' Second drive engine
103 Transmission
104 Transom
105 Thrust tube
106 Propeller shaft
107 Propeller
110 Trim cylinder
111 Articulation point
112 Stroke sensor, trim cylinder
114 Trim tab, right
115 Trim tab, left
116 Trim tab cylinder, right
117 Trim tab cylinder, left
120 Trim tab sensor, right
121 Trim tab sensor, left
123 Rotational speed sensor, propeller shaft
124 Slotted disc
125 Driveshaft
130 Electronic control unit
131 Control panel
132 Central hydraulic unit
133 Value table in electronic control unit 130
134 Engine regulator
135 Control loop for drive unit 140
135' Control loop for second drive unit 140'
136 Step in the control loop: Compare regulation variable—reference variable
137 Step in the control loop: Correcting variable
138 Step in the control loop: Regulation variable
140 Drive unit
140' Second drive unit
190 Longitudinal axis
202 Speed measuring device
S1 First driving mode
S2 Second driving mode
S3 Third driving mode
S4 Fourth driving mode
n Rotational speed
Δn Rotational speed increment
n_11 Initial rotational speed of S1
n_12 Rotational speed limit from S1 to S2
n_23 Rotational speed limit from S2 to S3
n_32 Rotational speed limit from S3 to S2 (in deceleration)
n_34 Rotational speed limit from S3 to S4
n_40 Defined rotational speed of S4
Δn_40 Regulation differential
v Speed of the watercraft
v_40 Maximum speed of the watercraft
γ Trim tab angle, general
γ_R Trim tab angle, right
γ_L Trim tab angle, left
γ_P Upper trim tab limit angle
γ_N Lower trim tab limit angle
γ_0 Center position of the trim tab angle
γ_40 Optimal trim tab angle for the maximum speed of the watercraft
τ Trim angle
Δτ Trim angle increment
τ_1 Trim angle of first drive unit 140
τ_2 Trim angle of second drive unit 140'
τ_P Upper trim angle limit
τ_N lower trim angle limit
τ_0 Center position of the trim angle
τ_G Trim range
τ_30 Correction range for trimming in S3
τ_31 Upper correction limit for trimming in S3
τ_32 Lower correction limit for trimming in S3
τ_40 Optimal trim angle in S4
τ_40' Optimal trim angle in S4 for second drive unit 140'
τ_1 Trim angle relative to first drive unit 140 in case of several drive units
τ_2 Trim angle relative to first drive unit 140' in case of several drive units

The invention claimed is:

1. A method of controlling a surface drive of a watercraft (100) comprising at least two drive units (140, 140') each being driven by a respective drive engine (102, 102'), each of the at least two drive units (140, 140') comprising a thrust tube (105) guiding a propeller shaft (106) and a trim actuation system (110,112) controlled by an electronic control unit (130), the thrust tube (105) being pivotable vertically about an articulation point (111) mounted to a transom (104) about a trim angle (τ) within a trim range (τ_G), and the propeller shaft (106) being flexibly connected, via the articulation point (111), to a drive shaft (125), and the surface drive being operated in at least first and second different driving modes, the method comprising the steps of:

when operating the surface drive in the second driving mode in which a maximum speed (v_40) of the watercraft can be achieved, operating at least one of the engine (102), the drive shaft (125) and the propeller shaft (106) of the watercraft (100) at a maximum rotational speed (n), and automatically adjusting the trim angles ($\tau\_1$, $\tau\_2$) of each of the two drive units (140, 140'), independently of one another, while operating the at least one of the engine (102), the drive shaft (125) and the propeller shaft (106) at the maximum rotational speed (n), to achieve the maximum speed (v_40) of the watercraft.

2. The method of controlling a drive for a watercraft according to claim 1, further comprising the step of automatically adjusting the trim angles ($\tau\_1$, $\tau\_2$) of the individual drive units (140, 140') independently of one another, via a closed control loop, such that the defined rotational speed (n_40) is set at the drive units (140, 140') during the driving mode in which the highest speed of watercraft (100) is reached.

3. The method of controlling a drive for a watercraft according to claim 1, further comprising the step of automatically setting, with a controller, a predetermined trim angle ($\tau\_40$) for each drive unit (140, 140'), at which the defined rotational speed (n_40) arises at the respective drive unit (140, 140'), independently of one another during the driving mode in which the highest speed of the watercraft is reached.

4. The method of controlling a drive for a watercraft according to claim 1, further comprising the step of one of deriving the trim angle ($\tau$) to be set as a function of one of the rotational speed (n) and a watercraft speed (v) from a value table (133) stored in the electronic control unit (130), in which intermediate values are interpolated and calculating the trim angle ($\tau$) from a stored function, during a controlled driving mode in which the highest speed is not reached.

5. The method of controlling a drive or a watercraft according to claim 1, further comprising the steps of, in addition to the driving mode in which the watercraft reaches the maximum speed, providing a slow travel mode (S1) starting from a first rotational speed limit (n_11) in which the automatic adjustment of trim angle ($\tau$) is passive, such that the trim angle ($\tau$) is manually adjusted by an operator, as desired, within the trim range (96 _G), and, only when the slow travel mode (S1) is discontinued, activating automatic adjustment of the trim angle ($\tau$).

6. The method of controlling a drive for a watercraft according to claim 1, further comprising the steps of operating the surface drive in four driving modes, with an increase of the rotational speed (n) during a slow travel mode (S1), a second driving mode (S2) follows starting from a second rotational speed limit (n_12), a third driving mode (S3) follows starting from a third rotational speed limit (n_23), and a fourth driving mode (S4) follows starting from a fourth rotational speed limit (n_34), the automatic trimming is controlled during the second driving mode (S2) and the third driving mode (S3) and the maximum speed (v_40) of the watercraft being reached during the fourth driving mode (S4).

7. The method of controlling a drive for a watercraft according to claim 6, further comprising the steps of, during the slow travel mode (S1), the second driving mode (S2), and the third driving mode (S3), adjusting the trim angles ($\tau$) of the individual drive units (140, 140) in the same direction and by the same amount, and using a mean value of the rotational speeds of the individual drive units (140, 140) as the rotational signal for controlling the trim angle ($\tau$) during the second driving mode (S2) and the third driving mode (S3).

8. The method of controlling a drive for a watercraft according to claim 1, further comprising the steps of, during an automatic trimming, displacing a trim tab (114, 115) located on a left and a right side of the transom (104) by a trim tab angle ($\gamma$) identical in magnitude and direction between an upper trim tab limit angle ($\gamma\_P$) and a lower trim tab limit angle ($\gamma\_N$) to aid the drive unit (140) in moderating a position of a longitudinal axis of a hull of the watercraft in water relative to horizontal.

9. The method of controlling a drive for a watercraft according to claim 8, further comprising the steps of, while during the driving mode in which the maximum speed of the watercraft is reached, automatically setting a previously determined trim tab angle ($\gamma\_40$), with the electronic control unit, at which a resistance to travel motion of a hull (101) of the watercraft (100) is preferably lowest.

10. The method of controlling a drive for watercraft according to claim 9, further comprising the steps of, during the driving mode in which the maximum speed of the watercraft is reached, automatically adjusting the trim tab angle ($\gamma\_40$), in a closed control loop, such that the speed of the watercraft is maximal (v_40).

11. A method of controlling a surface drive of a watercraft (100) comprising at least two drive units (140, 140') driven by a respective drive engine (102, 102'), each of the drive units (140, 140') comprising a thrust tube (105) supporting a propeller shaft (106) and a trim actuation system (110,112) being controlled by an electronic control unit (130), the thrust tube (105) being vertically pivotable about an articulation point (111) mounted on a transom (104) by a trim angle ($\tau$) within a trim range ($\tau\_G$), and the propeller shaft (106) being flexibly connected at the articulation point (111) to a drive shaft (125), the method comprising the steps of:

during a slow travel mode (S1), which includes an idle rotation speed (n_11) of the engine (102), operating the surface drive such that the drive rotates at a rotational speed (n) between the idle speed (n_11) and a second rotational speed limit (n_12), and the rotational speed (n) of the drive being proportional to speed of the watercraft (v);

during a second driving mode (S2), operating the surface drive such that the drive rotates at a rotational speed (n) between the second rotational speed limit (n_12) and a third rotational speed limit (n_23), and trimming being automatically controlled during the second driving mode (S2);

during a third driving mode (S3), which includes a rotation speed (n) at which one of the engine (102) and the propeller (104) achieves a highest efficiency, operating the surface drive such that the drive rotates at rotational speed (n) between the third rotational speed limit (n_23) and a fourth rotational speed limit (n_34), and automatically controlling the trimming during the in the third driving mode (S3);

during a fourth driving mode (S4), which includes a defined rotation speed (n_40) of the engine (102) at which the watercraft achieves a maximum possible speed (v_40) for given load and boating conditions, operating the surface drive such that the drive rotates at rotational speed (n) greater than the fourth rotational speed limit (n_34) and less than or equal to the defined rotation speed (n_40); and adjusting the trim angles ($\tau\_1$, $\tau\_2$) of the drive units (140, 140'), automatically and independently of one another during the fourth driving mode (S4), to reach the defined rotational speed (n_40) at which the maximum speed (v_40) is achieved.

* * * * *